United States Patent
Kim et al.

(10) Patent No.: US 8,577,100 B2
(45) Date of Patent: Nov. 5, 2013

(54) REMOTE INPUT METHOD USING FINGERPRINT RECOGNITION SENSOR

(75) Inventors: Kook-Jun Kim, Suwon-si (KR); Dae-Hyun Sim, Seoul (KR)

(73) Assignee: Samsung Electronics Co., Ltd (KR)

( * ) Notice: Subject to any disclaimer, the term of this patent is extended or adjusted under 35 U.S.C. 154(b) by 1621 days.

(21) Appl. No.: 11/591,106

(22) Filed: Nov. 1, 2006

(65) Prior Publication Data
US 2007/0110287 A1    May 17, 2007

(30) Foreign Application Priority Data
Nov. 1, 2005    (KR) .................. 10-2005-0104035

(51) Int. Cl.
*G06K 9/00* (2006.01)
*G06F 3/041* (2006.01)

(52) U.S. Cl.
CPC ................................ *G06K 9/00026* (2013.01)
USPC .......................................... 382/124; 345/173

(58) Field of Classification Search
None
See application file for complete search history.

(56) References Cited

U.S. PATENT DOCUMENTS

| | | | | |
|---|---|---|---|---|
| 5,936,611 | A * | 8/1999 | Yoshida | 345/158 |
| 2001/0040550 | A1* | 11/2001 | Vance et al. | 345/156 |
| 2005/0162402 | A1* | 7/2005 | Watanachote | 345/173 |
| 2005/0169503 | A1* | 8/2005 | Howell et al. | 382/115 |
| 2008/0240522 | A1* | 10/2008 | Gutta | 382/125 |

* cited by examiner

*Primary Examiner* — Edward Park
*Assistant Examiner* — Fred Hu
(74) *Attorney, Agent, or Firm* — The Farrell Law Firm, P.C.

(57) ABSTRACT

Disclosed is a remote input method using a fingerprint recognition sensor. A main device activates a fingerprint input mode according to a user's request, and displays a key input unit, menu images and an indicator corresponding to the fingerprint input mode. A remote input device having the fingerprint recognition sensor generates fingerprint data corresponding to the finger touching method in real time, and sends the generated fingerprint data to the main device through a short range wireless communication module. When receiving the fingerprint data, the main device analyzes the type of fingerprint included in the fingerprint data based on the previously stored fingerprint information. The main device also analyzes the user input pattern according to the type of fingerprint and the fingerprint data reception type. Consequently, the main device implements a preset function corresponding to the analyzed user input pattern. The user can control various functions available in the main device using the remote input unit.

13 Claims, 4 Drawing Sheets

REMOTE INPUT METHOD USING FINGERPRINT RECOGNITION SENSOR

PRIORITY

This application claims priority to an application entitled "Remote Input Method Using Fingerprint Recognition Sensor" filed with the Korean Intellectual Property Office on Nov. 1, 2005 and assigned Serial No. 2005-104035, the contents of which are hereby incorporated by reference.

BACKGROUND OF THE INVENTION

1. Field of the Invention

The present invention relates to an input method using a remote input device, and more particularly to a remote input method for transmitting a user input to a main device through an auxiliary input device having a fingerprint recognition sensor.

2. Description of the Related Art

Generally, a user input unit of a handheld device, such as a mobile communication terminal, is a keypad. Users can input data by directly pressing keys provided on the key pad. Due to the trend toward small mobile terminals with a large display screen, the actual area assigned to the user input unit is becoming smaller with a reduced number and size of the keys and a tight spacing of the keys. As a result, users may have some difficulty using the small-sized and tightly-spaced keys accurately. Those keys may increase the possibility that the users press a wrong key during the input of data. Such problems arise more frequently during the use of a mobile terminal having an unusual shape, for example, a watch-shaped phone.

Recently, a remote input means, such as a remote controller, has become available to control a mobile terminal which acts as a main device. The remote input means is generally provided with only up/down keys and a small number of function keys. A user can control the main device, i.e. the mobile terminal, using the remote input means, instead of using the user input unit included in the mobile terminal. However, only a few functions can be controlled using the remote input means. To control more functions of the main device using the remote input means, the number of keys provided on the remote input means needs to be increased, which results in an increase of the overall size of the remote input means.

Therefore, a need exists to develop a small-sized remote input means having a simple structure, while being capable of inputting commands for controlling various functions available in a main device, such as a mobile terminal, to the main device.

SUMMARY OF THE INVENTION

Accordingly, the present invention has been made to solve the above-mentioned problems occurring in the prior art, and an object of the present invention is to provide a remote input method for controlling various functions of a main device.

Another object of the present invention is to provide a remote input method using a small-sized remote input device having a simple structure.

In order to accomplish the above objects of the present invention, there is provided a remote input method using a fingerprint recognition sensor, which includes setting a main device to a fingerprint input mode according to a user's request and displaying a key input unit, menu images and an indicator corresponding to the current fingerprint input mode on a display unit of the main device; generating fingerprint data corresponding to the user's finger touching manner from a remote input device having the fingerprint recognition sensor and transmitting the generated fingerprint data to the main device through a short range wireless communication module of the remote input device; analyzing the received fingerprint data in the main device to determine the type of fingerprint based on previously stored fingerprint information; and analyzing a user input pattern based on the determined fingerprint type and the received fingerprint data, and performing a preset function corresponding to the user input pattern.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described with reference to the accompanying drawings. Descriptions of well-known functions and constructions are omitted for clarity and conciseness.

Figure 1:
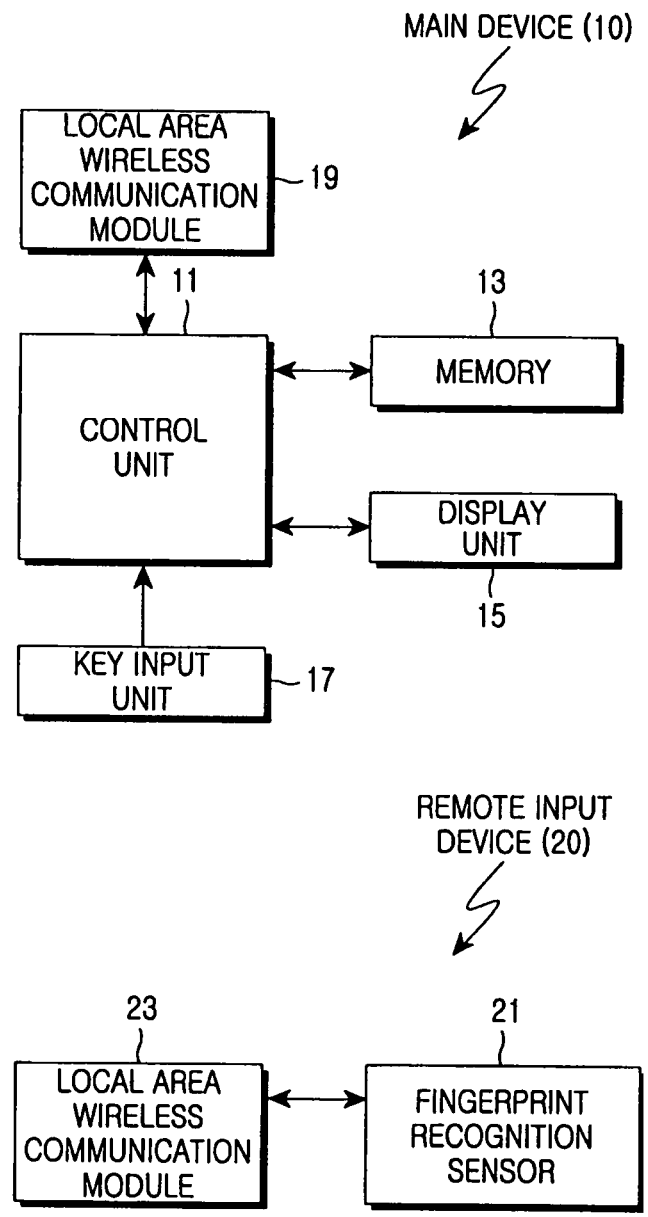
FIG. 1 is a block diagram of a main device and a remote input device according to the present invention.

FIG. 1 is a block diagram of a main device and a remote input device according to the present invention. The remote input device is capable of inputting data to the main device. The remote input device generates data related to a mode or a function of the main device according to the user's operation and sends the generated data to the main device. The main device then implements the mode or function corresponding to the data received from the remote input device. In the present invention, the main device can be a handheld device, such as a mobile communication terminal or a Personal Digital Assistant (PDA). The configurations of the main device and the remote input device according to the present invention will be explained with reference to FIG. 1. Referring to FIG. 1, the main device 10 includes a control unit 11, a memory 13, a display unit 15, a key input unit 17 and a short range wireless communication module 19. The remote input device 20 includes a short range wireless communication module 23 and a fingerprint recognition sensor 21.

The fingerprint recognition sensor 21 of the remote input device 20 senses the user's fingerprint when the user's finger touches the surface of the sensor, generates corresponding fingerprint data and outputs the generated fingerprint data to the short range wireless communication module 23. The fingerprint recognition sensor 21 generates fingerprint image data corresponding to the user's fingerprint pattern in accordance with the amount of current change with the touch of the finger. The fingerprint recognition sensor 21 has an array in the form of a lattice with x and y axes, for example, an 8×196 array, on the outer surface thereof so that it can generate coordinate data based on the x and y coordinate values which change with the movement of the finger. In the present invention, the fingerprint data includes both the fingerprint image data and the coordinate data. The fingerprint data also includes all other data which has been generated from the fingerprint recognition sensor 21 to be transmitted to the main device 10. The fingerprint data is sent to the main device 10 in real time.

The short range wireless communication modules 19 and 23 included in the main device 10 and the remote input device 20, respectively, are used for short range wireless communication. These modules 19 and 23 send the fingerprint data input from the fingerprint recognition sensor 21 to the main device 10 in real time. In the present invention, the short range wireless communication module 23 can be a Bluetooth® communication module, an IrDA (Infrared Data Association) communication module or a Zigbee communication module. It is preferable to use a Zigbee communication module which offers low power consumption, low cost wireless networking and lower data rate than a Bluetooth® communication module, and which supports up to 255 devices per network.

Figure 4:
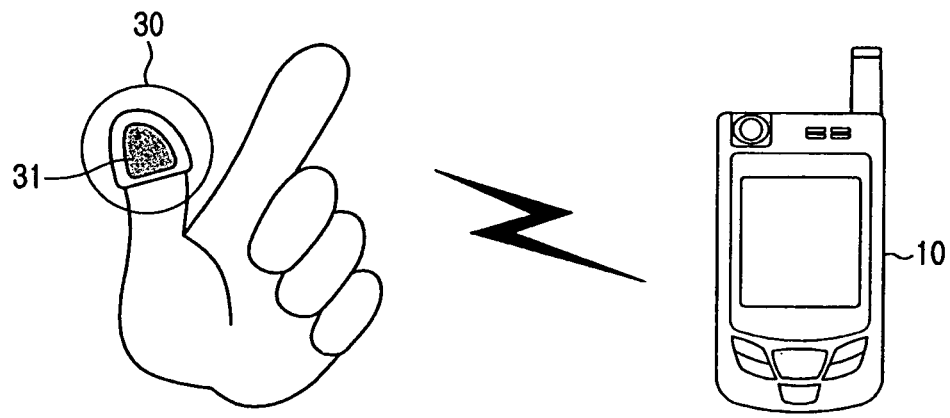
FIG. 4 is a view illustrating a main device and a remote input device according to the present invention.
Figure 5:
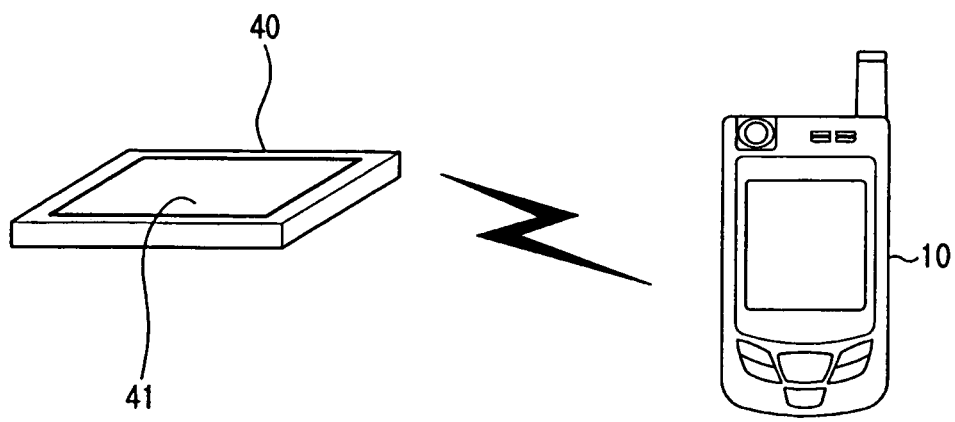
FIG. 5 is a view illustrating a main device and a remote input device according to another embodiment of the present invention.

The remote input device 20 can be formed in a thimble shape as illustrated in FIG. 4. FIG. 4 illustrates the appearances of the main device and the auxiliary (remote) input device according to the present invention. As illustrated in FIG. 4, the thimble-shaped remote input device 30 can be capped onto the user's finger. A fingerprint recognition sensor 31 is mounted on the outer surface of the thimble-shaped remote input device 30. Alternatively, the remote input device can be formed in a rectangular shape as illustrated in FIG. 5. FIG. 5 illustrates the appearances of the main device and the auxiliary (remote) input device according to another embodiment of the present invention. The rectangular remote input device 40 also includes a fingerprint recognition sensor 41 on the outer surface thereof.

The control unit 11 of the main device 10 controls the overall operations of the main device 10. Under the control of the control unit 11, the display unit 15 displays various images or text according to the operation of the main device 10.

The key input unit 17 is provided with a plurality of alphanumeric keys and function keys for implementing various functions. The key input unit 17 transmits data corresponding to the user's key input to the control unit 11.

The short range wireless communication module 19 performs short-range wireless communication with the short range wireless communication module 23 of the remote input device 20. In the present invention, the short range wireless communication module 19 receives fingerprint data transmitted from the remote input device 20 and outputs the received fingerprint data to the control unit 11.

The memory 13 stores programs for any processing or control by the control unit 11, reference data and various updateable data to serve as a working memory for the control unit 11. Also, the memory 13 stores fingerprint input menu program data, fingerprint input mode program data, program data for analyzing fingerprint data generated by the fingerprint recognition sensor 21 and extracting the user's fingerprint image and the location coordinates of the fingerprint image, and program data for applying the extracted location coordinates to the movement of an indicator.

The fingerprint input mode refers to a mode for analyzing fingerprint data received from the remote input device 20 and controlling the operation of the main device 10 accordingly. In other words, the fingerprint input mode is a mode for setting the remote input device 20 as a user interface. The user can set the fingerprint input mode using the fingerprint input menu available in the main device 10 according to the present invention.

As a menu used to set the fingerprint input mode, the fingerprint input menu contains items, such as fingerprint input mode setting, a fingerprint information registration and input pattern registration. The fingerprint information registration item can be selected to register the user's fingerprint information which is image information corresponding to the user's fingerprint. The fingerprint information is obtained from the fingerprint recognition sensor 21 and stored in the memory 13. When the user selects the fingerprint information registration item under the fingerprint input menu, the control unit 11 activates a fingerprint information registration mode. Subsequently, when the user's finger touches the fingerprint recognition sensor 21 of the remote input device 20, the fingerprint recognition sensor 21 generates image data corresponding to the user's fingerprint and sends the generated image data to the main device 10 through the short range wireless communication module 23. Then, the control unit 11 of the main device 10 registers the received fingerprint image data as the fingerprint information.

The input pattern registration item can be selected to set a shortcut corresponding to the pattern of the user's input through the fingerprint recognition sensor 21 of the remote input device 20. The input pattern may vary depending on the type of fingerprint detected by the fingerprint recognition sensor 21 and the finger touching method on the fingerprint recognition sensor 21. An individual has different types of fingerprints on each finger. The finger touching method can be the number of touches, i.e. finger contacts on the fingerprint recognition sensor 21. For example, the user may touch the fingerprint recognition sensor 21 with a thumb for a predetermined short period of time, separate the thumb from the sensor 21 for another predetermined period of time, and then touch again the sensor 21 by the thumb for the same short period of time. Different numbers of touches are recognized as different finger touching methods. If the user's thumb is separated from the fingerprint recognition sensor 21 over the predetermined period of time after the first touch, the single touch will be recognized as the finger touching method. In other words, the input pattern is determined according to the finger that touches the fingerprint recognition sensor 21 and the number of touches or fingerprint inputs. When the fingerprint recognition sensor 21 generates fingerprint data according to the finger touching method, the remote input device 20 sends the generated fingerprint data to the main device 10 in real time.

The shortcut corresponding to the input pattern can be set according to the user's selection or a default value. For example, the shortcut can be a function for entering a frequently used menu. When the main device 10 is a mobile phone, the shortcut can be a shortcut dialing function for making an outgoing call to an intended telephone number. Different shortcut functions can be set according to the operation modes of the main device 10. In other words, two or more shortcut functions, rather than a single shortcut function, can be set for a specific input pattern in different operation modes of the main device 10. For example, if the main device 10 is a mobile phone, one shortcut function implemented in the standby mode and another shortcut function implemented in the text input mode can be set for a specific input pattern.

Figure 2:
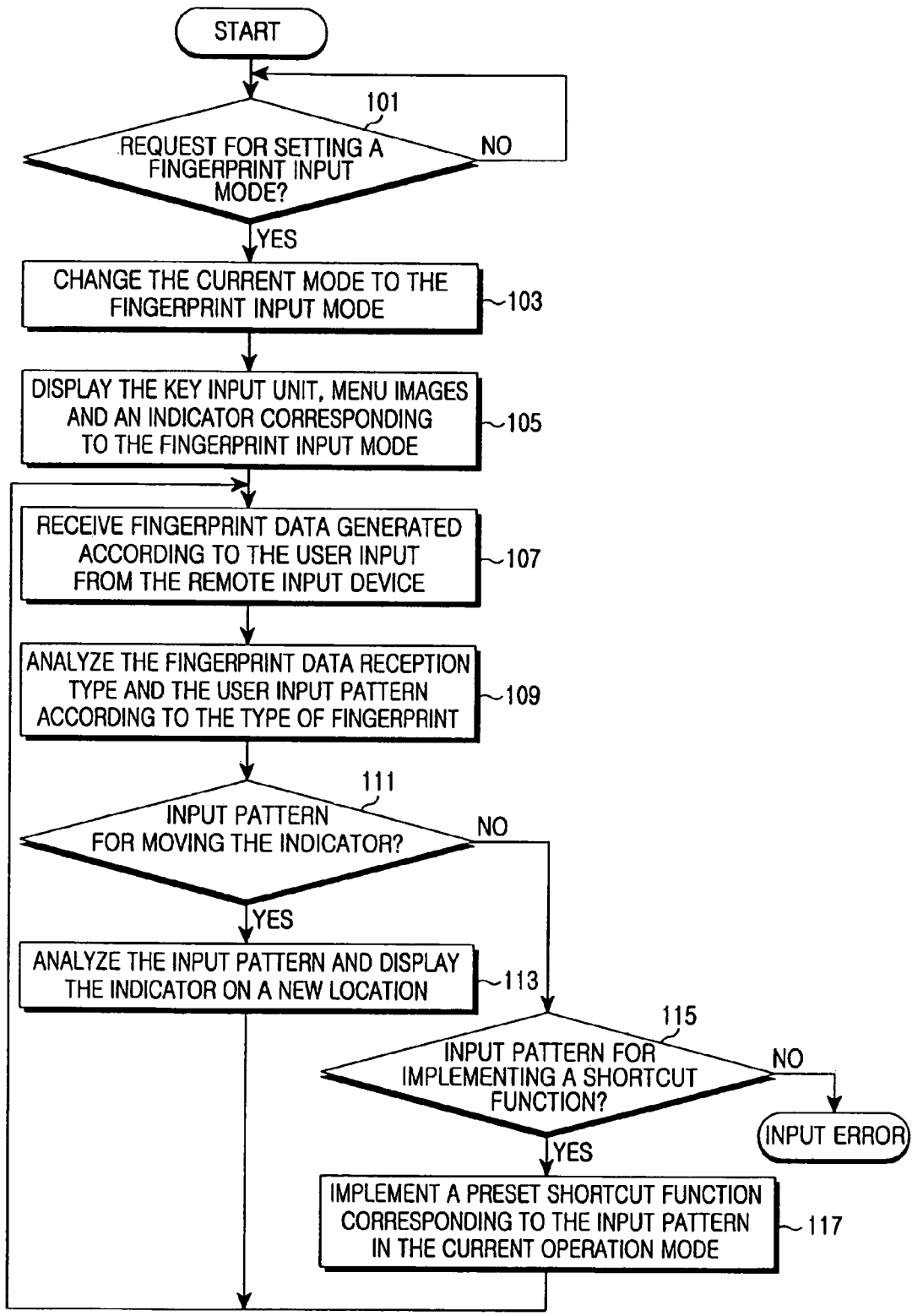
FIG. 2 is a flowchart showing the operation of a main device according to the present invention.
Figure 3:
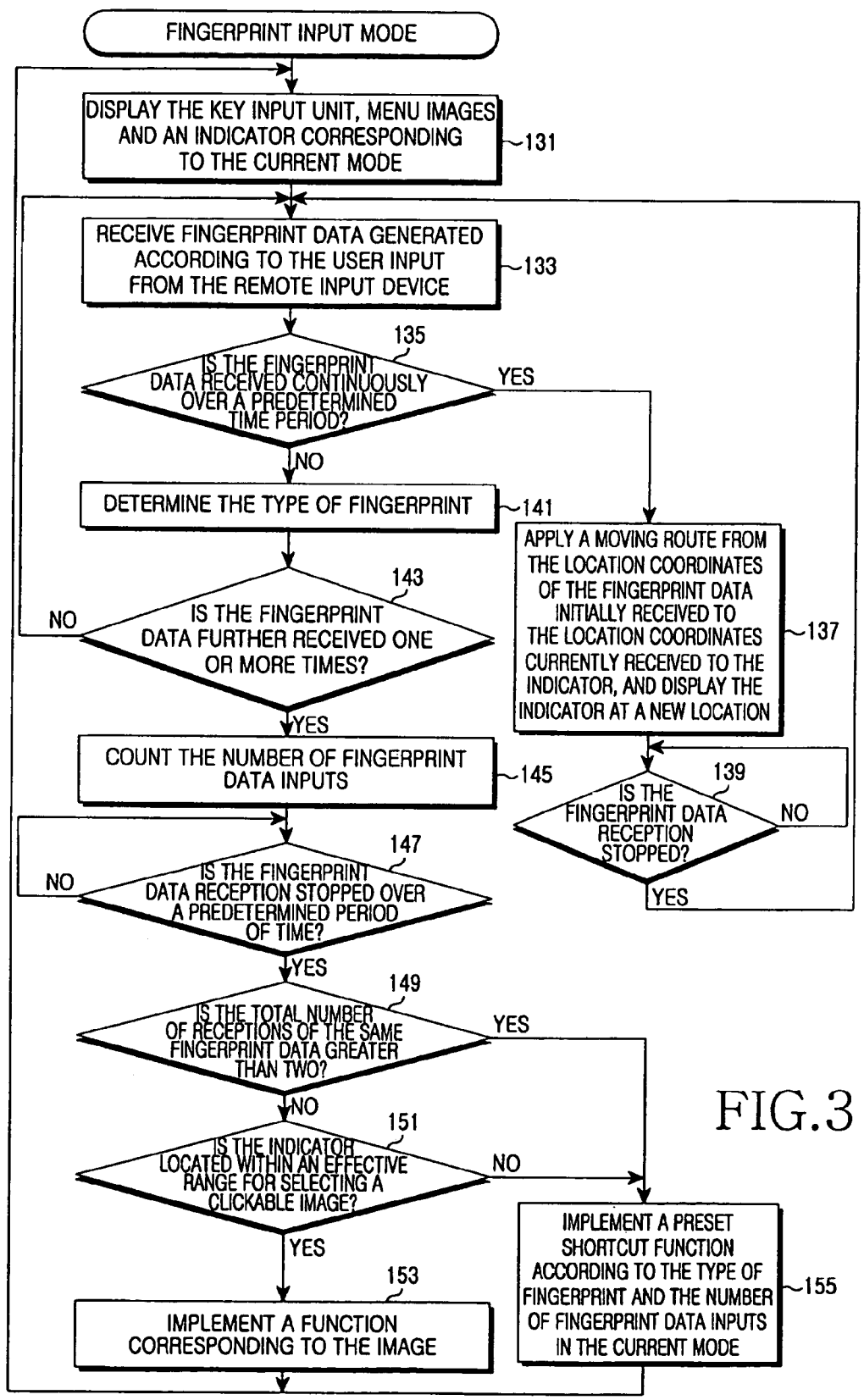
FIG. 3 is a flowchart showing the operation of a main device according to another embodiment of the present invention.

The operation of the main device 10 that receives fingerprint data from the remote input device 20 will be explained in detail with reference to FIGS. 2 and 3. FIG. 2 is a flowchart showing the operation of the main device according to the present invention. FIG. 3 is a flowchart showing the operation of the main device according to another embodiment of the present invention.

Referring to FIG. 2, when a user inputs a request to set the fingerprint input mode in step 101, the control unit 11 of the main device 10 changes the current mode of the main device 10 to the fingerprint input mode in step 103, and proceeds to step 105. The control unit 11 displays the key input unit, menu images and an indicator corresponding to the fingerprint input mode on the display unit in step 105, and proceeds to step 107.

After confirming the display of the above images, the user can touch the fingerprint recognition sensor 21 of the remote input device 20 with a finger in a desired input pattern. Then, the remote input device 20 generates fingerprint data in real time and sends the generated fingerprint data to the main device 10 through the short range wireless communication module 23. In step 107, the control unit 11 of the main device 10 receives the fingerprint data from the remote input device 20.

In step 109, the control unit 11 analyzes the fingerprint data reception type and the user input pattern including the type of fingerprint. In step 111, the control unit 11 confirms whether the analyzed input pattern is one for moving the location of the indicator. The input pattern for moving the location of the indicator is recognized when specific fingerprint data is continuously received over a predetermined period of time. In other words, the input pattern is recognized when the user touches the fingerprint recognition sensor 21 with a specific finger over the predetermined period of time. If the control unit 11 confirms that the analyzed input pattern is one for moving the location of the indicator in step 111, it proceeds to step 113. Otherwise, the control unit 11 proceeds to step 115. In step 113, the control unit 11 analyzes the input pattern, changes the location of the indicator and displays the indicator at the new location. To be specific, the control unit 11 analyzes the location coordinates included in the fingerprint data and applies the coordinates to the indicator.

In step 115, the control unit 11 confirms whether the analyzed input pattern is one set to implement a shortcut function. If the control unit 11 confirms that the input pattern is set to implement a shortcut function, it proceeds to step 117. Otherwise, the control unit 11 recognizes the input pattern as an input error. In step 117, the control unit 11 implements a preset shortcut function corresponding to the input pattern in the current operation mode of the main device 10, and the process returns to step 107.

As explained above, the main device 10 receives fingerprint data from the remove input device 20 in the fingerprint input mode, and analyzes the type of fingerprint included in the fingerprint data and the fingerprint data reception type in order to determine the input pattern. According to the determined input pattern, the main device 10 moves the indicator or implements a preset shortcut function corresponding to the input pattern.

Hereinafter, the operation of the main device 10 to analyze the input pattern in the fingerprint input mode will be explained in detail with reference to FIG. 3. When the fingerprint input mode is set, the control unit 11 of the main device 10 proceeds to step 131 in order to display the key input unit, menu images and an indicator corresponding to the current operation mode (i.e. fingerprint input mode) on the display screen. In step 133, the control unit 11 receives fingerprint data generated according to the user's input from the remote input device 20. In step 135, the control unit 11 determines whether the fingerprint data is continuously received over a predetermined period of time. If the fingerprint data is continuously received over the predetermined period of time, the control unit 11 proceeds to step 137. Otherwise, the control unit 11 proceeds to step 141. If the fingerprint data is continuously received over the predetermined period of time, the control unit 11 recognizes the data reception as an input pattern for moving the location of the indicator. In step 137, the control unit 11 applies a moving route from the location coordinates of the fingerprint data initially received to the location coordinates currently received to the indicator, and displays the moved indicator. In step 139, the control unit 11 confirms whether the fingerprint data reception has stopped. If the fingerprint data reception has stopped, the control unit 11 then proceeds to step 133.

If the fingerprint data is not continuously received over the predetermined period of time, the control unit 11 proceeds to step 141. In this step, the control unit 11 compares the fingerprint image included in the fingerprint data with the previously stored fingerprint information to determine the type of fingerprint. When the fingerprint data is not continuously received over the predetermined period of time, such fingerprint data reception is not the input pattern for moving the location of the indicator. Thus, the control unit 11 performs the operation to determine an input pattern for implementing a shortcut function. In step 143, the control unit 11 determines whether the same fingerprint data is further received one or more times at a predetermined time interval. If the same fingerprint data is received one or more times, the control unit 11 proceeds to step 145. If the same fingerprint data is not further received, the control unit 11 returns to step 133. If the same fingerprint data is further received one or more times in step 143, the total number of receptions of the data will be twice or more times including the reception in step 135, which means that the user's finger touches the fingerprint recognition sensor 21 according to the input pattern for implementing a shortcut function. In step 145, the control unit 11 counts the number of receptions of the fingerprint data. In step 147, the control unit 11 determines whether the fingerprint data reception has stopped over a predetermined period of time. In step 149, the control unit 11 confirms whether the number of fingerprint data receptions is greater than two. If the number of fingerprint data receptions is less than two, the control unit 11 proceeds to step 151. Otherwise, if the number of fingerprint data receptions is two or more, the control unit 11 will proceed to step 155. The control unit 11 confirms three or more touches of the user's finger in step 155. The control unit 11 implements a preset shortcut function according to the type of fingerprint and the number of fingerprint inputs (i.e. finger touches) in the current operation mode.

If the control unit 11 confirms two touches or less of the user's finger, it then determines whether the current indicator is located within an effective range for selecting a clickable image in step 151. In other words, the control unit 11 confirms whether the indicator moved in step 137 is displayed in such a manner to overlap an image representing a menu or a key. If the control unit 11 determines that the current indicator is located within the effective range for selecting a clickable image, it proceeds to step 153 in order to implement a function corresponding to the image, and then returns to step 131. For example, if the indicator is located on an image representing a specific menu, the menu will be selected and opened. If the indicator is located on an image representing a number key, the corresponding number key will be selected.

If the control unit 11 determines that the current indicator is not located within an effective range for selecting a clickable image in step 151, it proceeds to step 155 in order to implement a shortcut function preset according to the type of fingerprint and the number of fingerprint inputs (i.e. finger touches) in the current operation mode, and returns to step 131. In other words, the control unit 11 determines that the current indicator is displayed not to overlap an image representing a menu or a key, and implements a shortcut function corresponding to the two fingerprint inputs.

In accordance with the present invention, the main device activates the fingerprint input mode according to the user's request, and displays the key input unit, menu images and an indicator corresponding to the fingerprint input mode. The remote input device having a fingerprint recognition sensor generates fingerprint data corresponding to the finger touching method in real time, and sends the generated fingerprint data to the main device through a short range wireless communication module. When receiving the fingerprint data, the main device analyzes the type of fingerprint included in the fingerprint data based on the previously stored fingerprint information. The main device also analyzes the user input pattern according to the type of fingerprint and the fingerprint data reception type. Consequently, the main device implements a preset function corresponding to the analyzed user input pattern. The present invention enables the user to control various functions available in the main device using the remote input unit.

Although preferred embodiments of the present invention have been described for illustrative purposes, those skilled in the art will appreciate that various modifications, additions and substitutions are possible, without departing from the scope and spirit of the invention. For example, the remote input device 20 can be formed in a rectangular shape as illustrated in FIG. 5 so that the user can even input text through the remote input device 20. If the main device 10 has a program for recognizing a text image and is set to a text input mode, the user can write text on the fingerprint recognition sensor 41 of the remote input device 40. Then, the remote input device 40 will generate corresponding fingerprint data and send the generated data to the main device 10. The main device 10 will display lines according to the received fingerprint data, thereby displaying a text image. The main device 10 will then process the text image as text. Therefore, this invention is not to be unduly limited to the illustrative embodiments set forth herein and various modifications, additions and substitutions are possible, without departing from the scope and spirit of the invention as disclosed in the accompanying claims, including the full scope of equivalents thereof.

What is claimed is:

1. A remote input method using a fingerprint recognition sensor, comprising the steps of:
   setting a main device to a fingerprint input mode according to a user's request and displaying a key input unit, menu images and an indicator corresponding to the current fingerprint input mode on a display unit of the main device;
   generating finger touching data corresponding to the user's duration of touching and number of touches from a remote input device having the fingerprint recognition sensor;
   generating, at the remote input device, fingerprint pattern data according to a fingerprint image corresponding to the user's finger touched on the fingerprint recognition sensor and coordinate value data of the user's finger;
   transmitting fingerprint data including the finger touching data, the fingerprint pattern data, and the coordinate value data to the main device through a short range wireless communication module of the remote input device;
   analyzing the fingerprint pattern data in the main device to determine the type of fingerprint based on previously stored fingerprint information;
   analyzing a user input pattern based on the determined fingerprint type and the received finger touching data, and performing a preset function corresponding to the user input pattern; and
   setting, in the main device, a certain function selected by the user corresponding to certain fingerprint data including certain finger touching data and certain fingerprint pattern data according to the user's input through the fingerprint recognition sensor,
   wherein when the main device is set to a text input mode, the main device displays lines according to the received fingerprint pattern data, thereby displaying a text image and processing the text image as text.

2. The remote input method according to claim 1, wherein the user input pattern includes an input pattern for moving the location of the indicator and input patterns for implementing various shortcut functions.

3. The remote input method according to claim 2, wherein the input pattern for moving the location of the indicator is continuous reception of the finger touching data over a predetermined period of time.

4. The remote input method according to claim 2, wherein the input patterns for implementing various shortcut functions are determined according to the different types of fingerprints on each finger and a number of finger contacts on the fingerprint recognition sensor.

5. The remote input method according to claim 3, further comprising detecting location coordinates included in the continuously received fingerprint pattern data by the main device if the analyzed input pattern is for moving the indicator, moving the indicator to a location corresponding to the detected location coordinates, and displaying the indicator at the new location.

6. The remote input method according to claim 4, further comprising implementing a preset shortcut function corresponding to the user input pattern in the main device, if the analyzed input pattern is for implementing various shortcut functions.

7. A remote input system using a fingerprint recognition sensor comprising:
   a remote input device having the fingerprint recognition sensor which generates finger touching data corresponding to a user's duration of touching and number of touches, and generates fingerprint pattern data according to a fingerprint image corresponding to user's finger touched on the fingerprint recognition sensor and coordinate value data of the touched user's finger; and
   the remote input device transmits fingerprint data including the finger touching data, the fingerprint pattern data, and the coordinate value data in real time through short range wireless communication; and
   a main device setting a fingerprint input mode according to the user's request, displaying a key input unit, menu images and an indicator corresponding to the fingerprint input mode on a display unit, receiving the fingerprint pattern data from the remote input device, analyzing the type of fingerprint included in the fingerprint pattern data based on previously stored fingerprint information, analyzing a user input pattern according to the type of fingerprint and the finger touching data reception type, implementing a preset function corresponding to the analyzed user input pattern, and setting, in the main device, a certain function selected by the user corresponding to certain fingerprint data including certain finger touching data and certain fingerprint pattern data according to the user's input through the fingerprint recognition sensor, wherein when the main device is set to a text input mode, the main device displays lines according to the received fingerprint pattern data, thereby displaying a text image and processing the text image as text.

8. The remote input system according to claim 7, wherein the user input pattern includes an input pattern for moving the indicator and input patterns for implementing various shortcut functions.

9. The remote input system according to claim 8, wherein the input pattern for moving the indicator is consecutive generations of the user input pattern data with continuous touch of a specific finger.

10. The remote input system according to claim 9, wherein the input patterns for implementing various shortcut functions are determined according to the different types of fingerprints on each finger and a number of finger contacts on the fingerprint recognition sensor.

11. The remote input system according to claim 10, wherein said remote input device is formed in a thimble shape and said fingerprint recognition sensor is mounted on the outer surface of the thimble-shaped remote input device.

12. The remote input system according to claim 11, wherein said main device detects location coordinates included in the consecutively received fingerprint pattern data if the analyzed input pattern is for moving the indicator, moves the indicator to a location corresponding to the detected location coordinates, and displays the indicator at the new location.

13. The remote input system according to claim 12, wherein the main device implements a preset shortcut function corresponding to the user input pattern data if the analyzed input pattern is for implementing a shortcut function.

* * * * *